July 3, 1956     A. SILVERSTEIN     2,752,951

TEMPERATURE COMPENSATED HYDRAULIC RESISTOR

Filed May 27, 1953

INVENTOR
ABRAHAM SILVERSTEIN

BY

ATTORNEYS

United States Patent Office 2,752,951
Patented July 3, 1956

2,752,951

TEMPERATURE COMPENSATED HYDRAULIC RESISTOR

Abraham Silverstein, Hyattsville, Md., assignor to the United States of America as represented by the Secretary of the Navy Application May 27, 1953, Serial No. 357,936

(Granted under Title 35, U. S. Code (1952), sec. 266)

1 Claim. (Cl. 138—45)

The invention described hereing may be manufactured and used by or for the Government of the United States of America for governmental purposes without the payment of any royalties thereon or therefor.

The present invention relates to a hydraulic resistor wherein compensation is made for variations in viscosity of the fluid caused by temperature changes whereby the flow of fluid through the resistor is constant for a given pressure applied thereto irrespective of the fluid temperature.

It has been found that in many applications the use of a conventional fixed orifice reducer or resistor in hydraulic lines is impractical where temperature changes are sufficient to materially affect the viscosity of the fluid flowing therethrough. In such cases the flow of fluid increases materially when the viscosity thereof is reduced by a temperature rise and decreases when the viscosity is increased by a drop in temperature. It has been found, for example, that 200 centistokes Silicone oil has a change in viscosity greater than 2 to 1 over a temperature range of 28° F. to 90° F.

The present invention, as aforesaid, compensates for temperature caused changes in viscosity of the fluid by providing a hollow steel cylinder filled with a flexible heat expansible material having a flat aperture or slit of suitable size extending therethrough from end to end. Thus, when the temperature is high and the viscosity of the fluid is low, the orifice or slit in the heat expansible material is reduced thereby compensating for the low viscosity of the fluid. When the temperature is low and the viscosity of the fluid is high, the orifice or slit in the heat expansible material is enlarged thereby compensating for the high viscosity of the fluid. Under each of the aforesaid conditions the fluid flows at the same rate for a given pressure applied to the fluid.

An object of the present invention is to provide a new and improved hydraulic resistor which is heat responsive thus to compensate for viscosity changes caused by the presence of heat in the fluid passing therethrough.

Another object is to provide a new and improved hydraulic resistor in which the orifice thereof is metered in accordance with the temperature of the fluid passing therethrough thus to compensate for variations of viscosity caused by changes in the temperature thereof.

Still another object is to provide a new and improved hydraulic resistor which is economical in manufacture and service and which is rugged and has long life.

A further object is to provide a new and improved method of making the hydraulic resistor of the present invention which is simple, inexpensive and ensures accuracy of results.

Other objects and many of the attendant advantages of this invention will be readily appreciated as the same becomes better understood by reference to the following detailed description when considered in connection with the accompanying drawings wherein.

Figure 1:
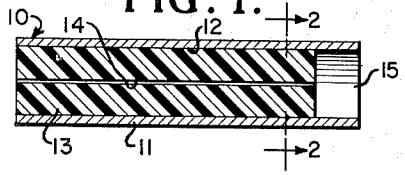
Fig. 1 is a longitudinal section of the device of the present invention.
Figure 2:
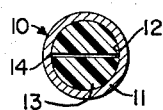
Fig. 2 is a sectional view taken along the line 2—2 of Fig. 1.
Figure 3:
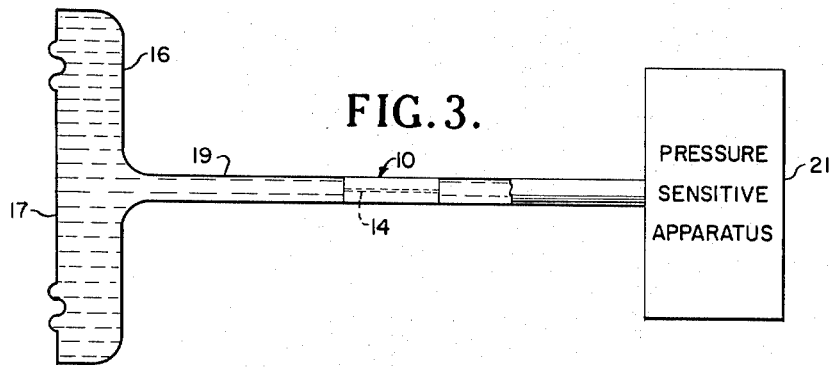
Fig. 3 is a diagram showing a suggested use of the device.

Referring more particularly to the drawings wherein like numerals indicate like parts throughout the several views 10 indicates generally the hydraulic resistor of the present invention which comprises a substantially non-expansible tubular member 11 formed of a suitable material such, for example, as a metal having low expansion characteristics. Cast within a bore 12 in member 11 is a quantity of heat expansible flexible filler material 13 which has high adhesion to the tubular member 11 and has formed therein a flat aperture or slit 14 running axially along the length of material 13 and substantially dividing the material into halves. For convenience in manufacturing a portion at one end of the tubular member 11 is left unfilled with material 13 as shown at 15. In use, the device 10 may be employed, as shown in Fig. 3, in a conduit 19 or otherwise arranged in a manner to restrict the flow of fluid from a device such, for example, as chamber 16 having a diaphragm 17, which is compressed by external pressure to cause such flow, and into a pressure-operated device 21. In this manner, because of the restricted orifice 14 device 21 is protected from sudden changes in pressure on diaphragm 17 as is well-known in the art. Additionally, the flow of fluid through orifice 14 is maintained constant for a given pressure on diaphragm 17 regardless of temperature.

In a specific instance where the fluid employed was 200 centistoke Silicone oil, it was found that the viscosity thereof varied as much as 2 to 1 over a temperature range of 28° F. to 90° F. In the present invention compensation is made for such temperature-caused variations in viscosity by varying the size of orifice 14 in accordance therewith, the size of the orifice by reason of the heat expansion characteristic of the material of which it is formed, enlarging and reducing in accordance with the rise and fall, respectively, of the viscosity of the fluid.

Any inherently flexible plastic material having desirable heat expansion qualities and having the properties of good adhesion to metal, resistance to the effect of oil, capable of being poured and settable thereafter, may be employed as the filler material 13, a material having such desirable qualities, for example, being the epoxy resin "Araldite E134" furnished by the Ciba Company of New York. This material is furnished in two viscous components, "Hardener" and "Resin." These components are mixed preferably in the proportion of 85 parts hardener to 75 parts resin to secure the desired consistency thereof. After mixing, the material begins to set, the setting period extending over many days at room temperature, 15 hours at 150° F. and 30 minutes at 350° F.

Figure 4:
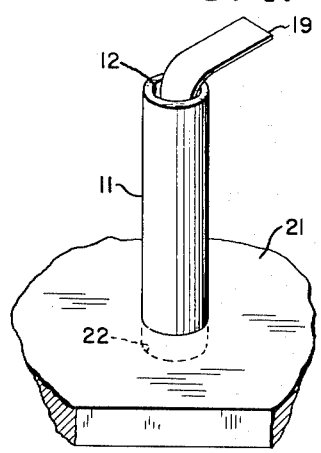
Fig. 4 is a perspective view of the device and showing the set up used in the manufacture thereof.
Figure 5:
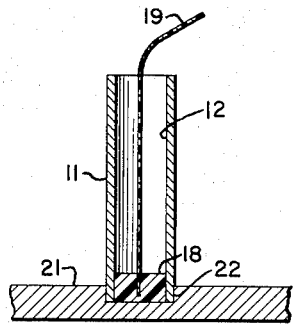
Fig. 5 is a vertical sectional view of the device of Fig. 4.

Before filling the tubular member 11, a split plug 18, preferably formed of a material having desirable qualities of flexibility and non-adhesion to the filler material such, for example, as polyethylene is inserted in one end thereof. A thin flexible plastic strip 19, preferably formed of sheet Teflon [polytetrafluoroethylene] or other material which has desirable qualities of flexibility, non-adhesion to the filler material, and is not affected by heat, is held at one end thereof in the split portion of the plug 18 and extends through the tubular member 11 and a distance beyond the open end thereof as clearly shown in Figs. 4 and 5. The width and thickness of the strip 19 governs the size of the orifice 14. The filler material 13 is now injected into the member 11 on both sides of strip 19, the member 11 being held in a vertical position, the open end being at the top thereof.

In order to maintain member 11 in a vertical position a base 21 may be provided having a partial bore 22 formed therein, it, of course, is clear that base 21 may be provided with a plurality of bores 22 to accommodate a plurality of members 11 and may be formed of expendable material, such as cardboard or wood.

The plastic material for forming filler 13 is heated to about 155° F., prior to injection into member 11, to reduce the viscosity thereof for injecting or pouring and to permit the rapid rise of air bubbles therethrough.

After the plastic material is injected into the member 11 to the top thereof, the member 11 is placed in an oven at 155° F. for about 10 minutes. At the end of this period it will be found that the level of the filler material has dropped due to the rise of air bubbles to the top thereof. Additional material is added to the member 11 which is again placed in the oven. This operation is repeated until the member 11 is completely filled. The member 11 is now placed preferably in the oven at 155° F. for 24 hours or longer. At the end of this period the filler material is solidified and firmly secured to the inner surface of member 11. It is, of course, understood that other curing means may be employed such, for example, as permitting the mixture to cure at room temperature. After cooling, the plug 18 is pried from the end of member 11. The strip 19 is now removed by drawing on the free end thereof. This leaves a smooth rectangular aperture 14 running the length of the filler material 13.

It is understood that the plastic material used as the filler 13 has the quality of expanding with heat and contracting with cold and that the mass of the material in proportion to the size of the orifice is such that the orifice enlarges and contracts in a degree necessary to compensate for the increase and decrease in viscosity of the fluid caused by such temperature variations, thus the fluid flows at a selected rate under a given pressure thereon regardless of the temperature and the resultant viscosity of the fluid.

It is, also, to be understood that by proportioning the cross-sectional mass of material greater or smaller with respect to the size of the orifice therethrough, the device of the present invention may be adapted to use with other oils or fluids having different viscosities.

While the present invention has been described for use with fluids, it is also clear that the device may also be used to restrict the flow of gases in the same manner.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

A hydraulic resistor for use in a conduit through which a fluid passes, a tubular member mounted in said conduit and having substantially constant dimensions when subjected to variations in temperature, and a plastic material filling said tubular member and having the qualities of expanding with heat and contracting with cold, said material having a relatively narrow rectangular orifice extending substantially diametrically of the tubular member and passing longitudinally therethrough whereby the size of the orifice varies in accordance with temperature changes to compensate for variations in viscosity of the fluid caused by such temperature changes.

References Cited in the file of this patent

UNITED STATES PATENTS

| | | |
|---|---|---|
| Re. 20,854 | Deckert | Sept. 13, 1938 |
| 1,531,712 | Meade | Mar. 31, 1925 |
| 1,964,638 | Kreidel | June 26, 1934 |
| 2,319,498 | Gerard | May 18, 1943 |
| 2,418,671 | Schweller | Apr. 8, 1947 |
| 2,421,713 | Porter | June 3, 1947 |
| 2,427,591 | Denison | Sept. 16, 1947 |